US006973848B2

(12) United States Patent
Kojima et al.

(10) Patent No.: US 6,973,848 B2
(45) **Date of Patent: *Dec. 13, 2005**

(54) OPERATING DEVICE

(75) Inventors: Shinichi Kojima, Tokyo (JP); Takashi Sogabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,379

(22) Filed: Apr. 21, 2005

(65) Prior Publication Data

US 2005/0183523 A1 Aug. 25, 2005

Related U.S. Application Data

(63) Continuation of application No. 10/333,037, filed as application No. PCT/JP02/04849 on May 20, 2002, now Pat. No. 6,918,313.

(30) Foreign Application Priority Data

May 21, 2001 (JP) ........................... P2001-150533
Apr. 17, 2002 (JP) ........................... P2002-114347

(51) Int. Cl.[7] ............................................. F16H 35/18
(52) U.S. Cl. .................................... 74/10.27; 74/10.22
(58) Field of Search ............................... 74/10 R, 10.1, 74/10.2, 10.22, 10.27, 10.5

(56) References Cited

U.S. PATENT DOCUMENTS

| | | | | | |
|---|---|---|---|---|---|
| 4,482,221 | A * | 11/1984 | Clark | ......................... | 359/392 |
| 4,616,517 | A * | 10/1986 | Esmay | ....................... | 74/10.45 |
| 6,069,754 | A * | 5/2000 | Schmidt | ..................... | 359/825 |
| 6,356,045 | B1 * | 3/2002 | Newton et al. | ............. | 318/561 |
| 2002/0080114 | A1 * | 6/2002 | Numata et al. | ............. | 345/156 |
| 2004/0032395 | A1 * | 2/2004 | Goldenberg et al. | ........ | 345/156 |
| 2004/0218265 | A1 * | 11/2004 | Peter et al. | ................. | 359/368 |

* cited by examiner

*Primary Examiner*—David Fenstermacher
(74) *Attorney, Agent, or Firm*—Jay H. Maioli

(57) ABSTRACT

An operating device having a rotary knob capable of rotation operations exhibits compatibility between speed and precision in operation and does not require use of a plurality of rotary knobs. In the operating device (1) including the rotary knob (4) and the rotation detecting means (8) for detecting the rotated angle of the rotary knob, the rotary knob includes a small-diameter component (4F) for operating the rotary knob quickly, and a large-diameter component (4S) for operating the rotary knob slowly or for fine adjustment, and the determining means (9) is provided for determining the rotated position of the rotary knob when the rotary knob is operated.

1 Claim, 7 Drawing Sheets

OPERATING DEVICE

This is a continuation of prior application Ser. No. 10/333,037 filed Jun. 16, 2003 now U.S. Pat. No. 6,918,313, which is a national stage of PCT/JP02/04849, filed May 20, 2002.

TECHNICAL FIELD

The present invention relates to a rotary operating device having a rotation detecting mechanism, which is user friendly and capable of rapid and precise operation.

BACKGROUND ART

In a known rotary operating device including a rotary knob, a required candidate is selected from list elements by operating the rotary knob, and then the candidate is fixed by pressing a switch or the like.

For example, an electronic operating device including a rotary encoder or the like in a rotation-operating mechanism is provided with a rotary operation knob so that an operator can select a required candidate by detecting the amount (angle) of the rotation of the operation knob.

However, in the conventional operating device, the rotary operation knob is formed of components having the same diameter; hence, the operating device is not user friendly in view of the operation speed and accuracy.

For example, with recent development of large-capacity recording media such as hard disks and data compression technology (such as MP3), it is nothing special that one medium can record an enormous amount of data. In such a circumstance, the file structure for handling folders and albums in the recording field in the same media is layered and the depth of the hierarchy increases. In one method for achieving a desired selection processing by a high-speed operation under such a condition, a rotary knob dedicated for a high-speed operation and a fine rotary knob dedicated for a low-speed operation and fine adjustment are provided. After the rotary knob for high-speed operation is rotated, the fine rotary knob for low-speed operation is rotated for retrieving and selecting a desired file or the like.

In such a method, however, an operator must use these two rotary knobs to suit the occasion with trouble, and cannot visually select the knob to be rotated in a minute.

Accordingly, an object of the present invention is to strike a balance between high-speed operation and accuracy in an operating device capable of a rotation operation by a rotary knob and is to avoid the necessity of the use of a plurality of rotary knobs.

DISCLOSURE OF INVENTION

In the present invention for solving the above problems, a rotary knob includes a small-diameter component for quickly rotating the rotary knob and a large-diameter component for slowly rotating the rotary knob or for finely adjusting the rotary knob, and determining means is provided for determining the rotated position of the rotary knob when the rotary knob is operated.

According to the present invention, the small-diameter component of the rotary knob is used for a quick rotation operation whereas the large-diameter component is used for a slow rotation operation or fine adjustment; hence, the quick operation and the slow or fine-adjustment operation can be visually distinguished.

BRIEF DESCRIPTION OF THE DRAWINGS

FIG. 2 is a side view of the main portion;

FIG. 5 is a drawing illustrating an appearance of a rotary knob assembled in a device;

FIGS. 7 to 9 are drawings illustrating an embodiment of an operation, FIG. 7 showing an embodiment of a screen page when the sound volume is adjusted;

FIG. 8 shows an embodiment of a screen page when a station is selected; and

FIG. 9 shows an embodiment of a screen page when a music piece is selected.

BEST MODE FOR CARRYING OUT THE INVENTION

Figure 1:
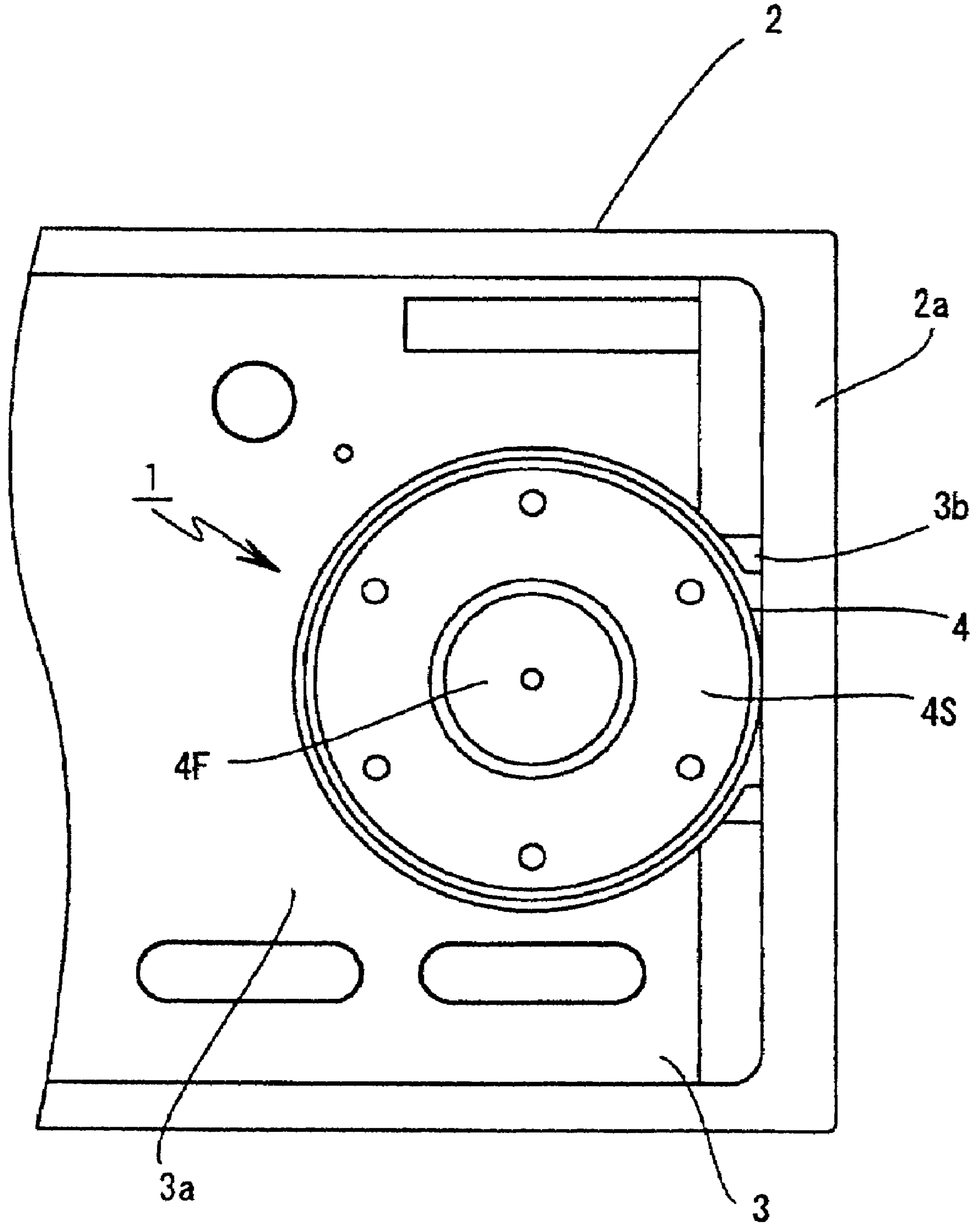
FIGS. 1 and 2 are drawings illustrating an embodiment according to the present invention, FIG. 1 being a front view of a main portion.
Figure 2:
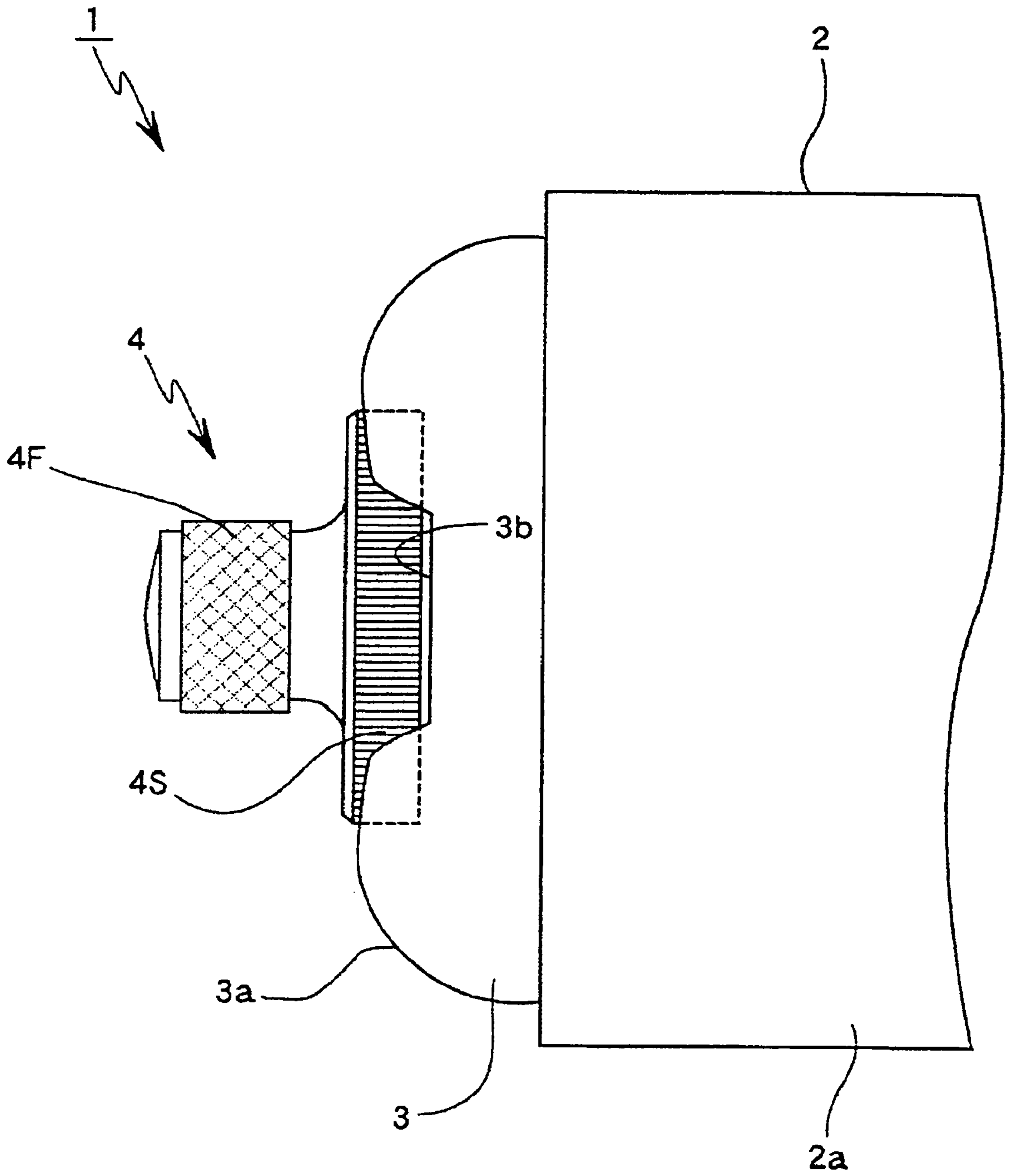

FIGS. 1 and 2 are drawings illustrating a basic structure according to the present invention and illustrate a main portion of an electronic apparatus 2 provided with an operating device 1.

In this embodiment, a body 2*a* of the electronic apparatus 2 is provided with a panel (operating panel) 3, and the operating device 1 is mounted to an operation board 3*a* of the panel 3.

FIGS. 1 and 2 show an embodiment of a rotary knob 4 that includes a disk large-diameter component 4S and a small-diameter component 4F having a smaller diameter than that of the large-diameter component 4S and protruding toward a direction remote from the operation board 3*a*, the large-diameter component 4S and the small-diameter component 4F being combined. More specifically, the small-diameter component 4F is used when the rotary knob 4 is rotated quickly, whereas the large-diameter component 4S is used when the rotary knob 4 is operated slowly or for fine adjustment.

The small-diameter component 4F and the large-diameter component 4S are coaxially disposed with respect to the rotating shaft of the rotary knob 4. The outer faces of the small-diameter component 4F and the large-diameter component 4S are subjected to nonslip treatment (irregularity, ribs, grooves, knurling, etc.) in view of operationality. For example, the small-diameter component 4F is rotated quickly with a thumb, an index finger, and a middle finger. The side of the panel 3 is provided with a cutout 3*b*, so that the periphery of the large-diameter component 4S can be rotated slowly, for example, with the pad of the index finger.

Figure 3:
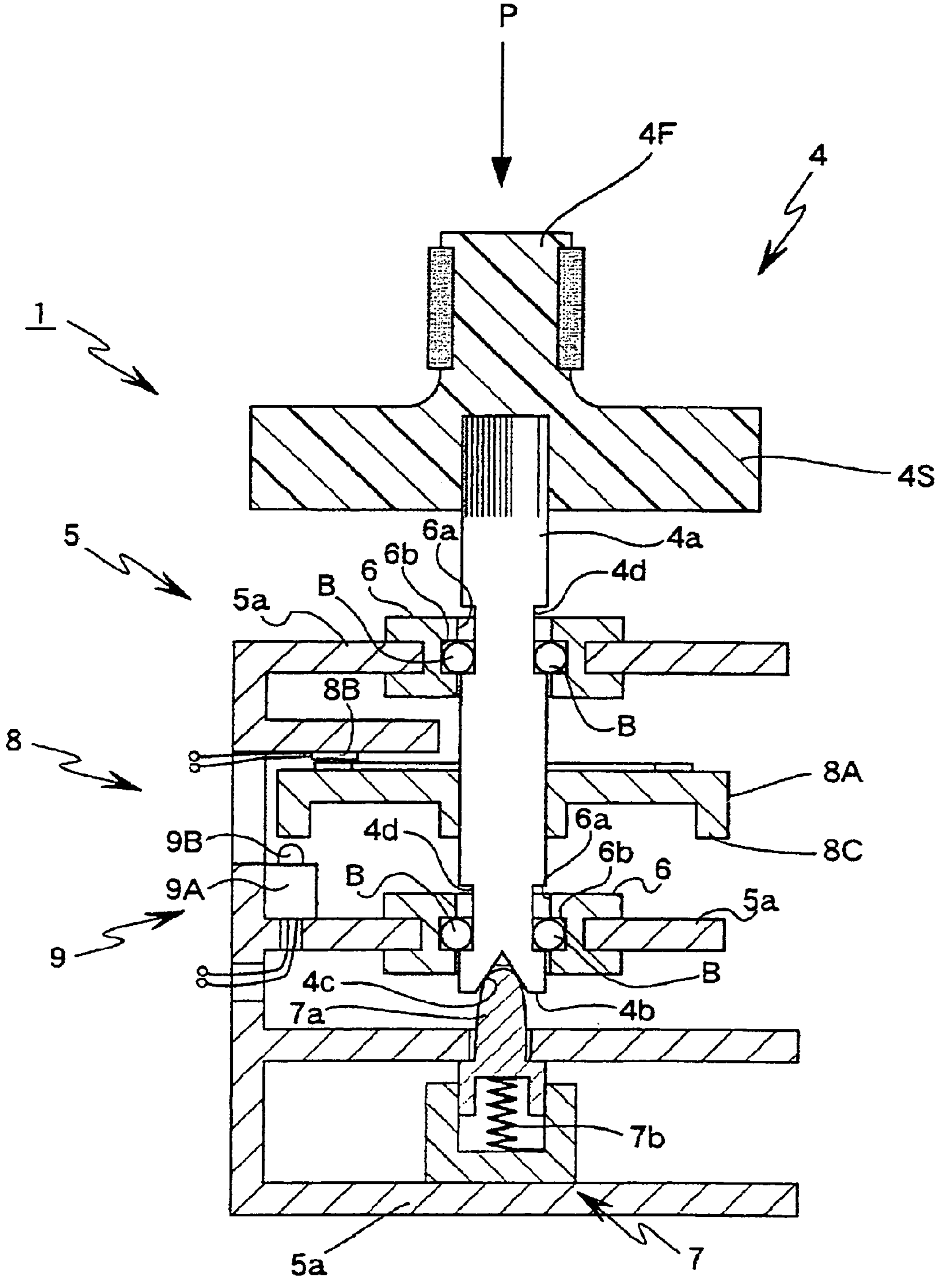
FIG. 3 is a drawing illustrating an embodiment of an internal structure of an operating device according to the present invention.

FIG. 3 illustrates an embodiment of the internal structure of the operating device 1.

The rotating shaft 4*a* of the rotary knob 4 extends through the central holes 6*a*,6*a* of shaft bearings 6,6 that are attached to a support 5*a* of a detecting unit 5. An end 4*b* (remote from the rotary knob 4) of the rotating shaft is supported by a thrust block 7. As shown in the drawing, The thrust block 7 includes a bearing portion 7*a*, which engages with a conical concavity 4*c* formed at an end 4*b* of the shaft, and an urging means (such as a coil spring) 7*b* for elastically fitting the bearing portion to the concavity 4*c*.

Concavities 6*b*,6*b* are formed on the inner faces of the central holes 6*a*,6*a* of the shaft bearings 6,6, while concavities 4*d*,4*d* facing the concavities 6*b*,6*b* are formed on the face of the rotating shaft 4*a*. Many metal balls B,B, . . . are disposed between the concavities 4*d*,4*d* and the concavities 6*b*,6*b*. The concavities 4*d*,4*d* are longer than the concavities 6*b*,6*b* in the axial direction of the rotating shaft 4*a*, so that the rotating shaft 4*a* can be moved in the axial direction.

The shaft bearings 6,6 are disposed at a predetermined distance, and a disk 8A (detected section) attached to the rotating shaft 4*a* therebetween is a component of a rotation detecting means 8 for detecting the rotated position (angle) of the rotary knob 4. For example, a sensor 8B is provided for the disk 8A, which is fixed to the rotating shaft 4*a* and is rotated together with the rotary knob 4. When an optical rotary encoder is used, it may be of a reflective type having a disk 8A provided with many reflective portions arranged at a given distance and a sensor 8B such as a photointerrupter, or may be of a transmissive type having a disk 8A provided with many slits along the circumference and a photosensor set arranged at both sides of the disk 8A. In addition to these types, a disk provided with a magnetized pattern along the circumference and a magnetic sensor are used in a magnetic detection type. Furthermore, various other types such as a resistance detecting type (for example, using a variable resistance pattern) may be used.

As shown in the drawing, an annular rib 8C is provided at the circumference of the disk 8A, in the direction along the rotating shaft 4*a*. The rib 8C faces a detecting unit 9A, which is, for example, a detecting switch pressed by the rib 8C.

The detecting unit 9A is a component of a determining means 9 for determining the rotated position (angle) of the rotary knob 4 after the operation of the rotary knob 4.

For example, the detecting unit 9A is provided with a counterpart 9B pressed by the rib 8C of the disk 8A. When the rotary knob 4 pressed in the direction shown by arrow P in FIG. 3 (toward the support 5*a*), its rotating shaft 4*a* moves along the central axis, and the disk 8A also moves simultaneously. The detecting unit 9A detects the pressed state of the counterpart 9B by the rib 8C of the disk 8A.

When the rotary knob 4 is quickly rotated in the use of the operating device 1, the small-diameter component 4F is operated. When the rotary knob 4 is slowly rotated, the large-diameter component 4S is operated. In both cases, the rotation of the disk 8A is detected by a sensor unit 8B. When the rotary knob 4 is pressed along the rotating shaft 4*a*, the counterpart 9B of the detecting unit 9A is pressed by the rib 8C of the disk 8A. The rotated position of the rotary knob 4 is thereby determined.

The detecting unit 9A constituting the determining means 9 is not limited to a contact sensor and may be any other type of sensor, for example, a non-contact sensor such as a proximity sensor.

In the above embodiment, the small-diameter component 4F and the large-diameter component 4S of the rotary knob 4 are coaxially fixed. The rib 8C of the disk 8A moves along the rotating shaft 4*a* in conjunction with the movement of the rotary knob 4 along the rotating shaft 4*a* and comes into contact with the counterpart 9B of the detecting unit 9A so that the determining means 9 determines the rotated position of the rotary knob 4. However, the structure is not limited to the above embodiment and may be those shown in FIGS. 4 and 5, for example.

Figure 4:
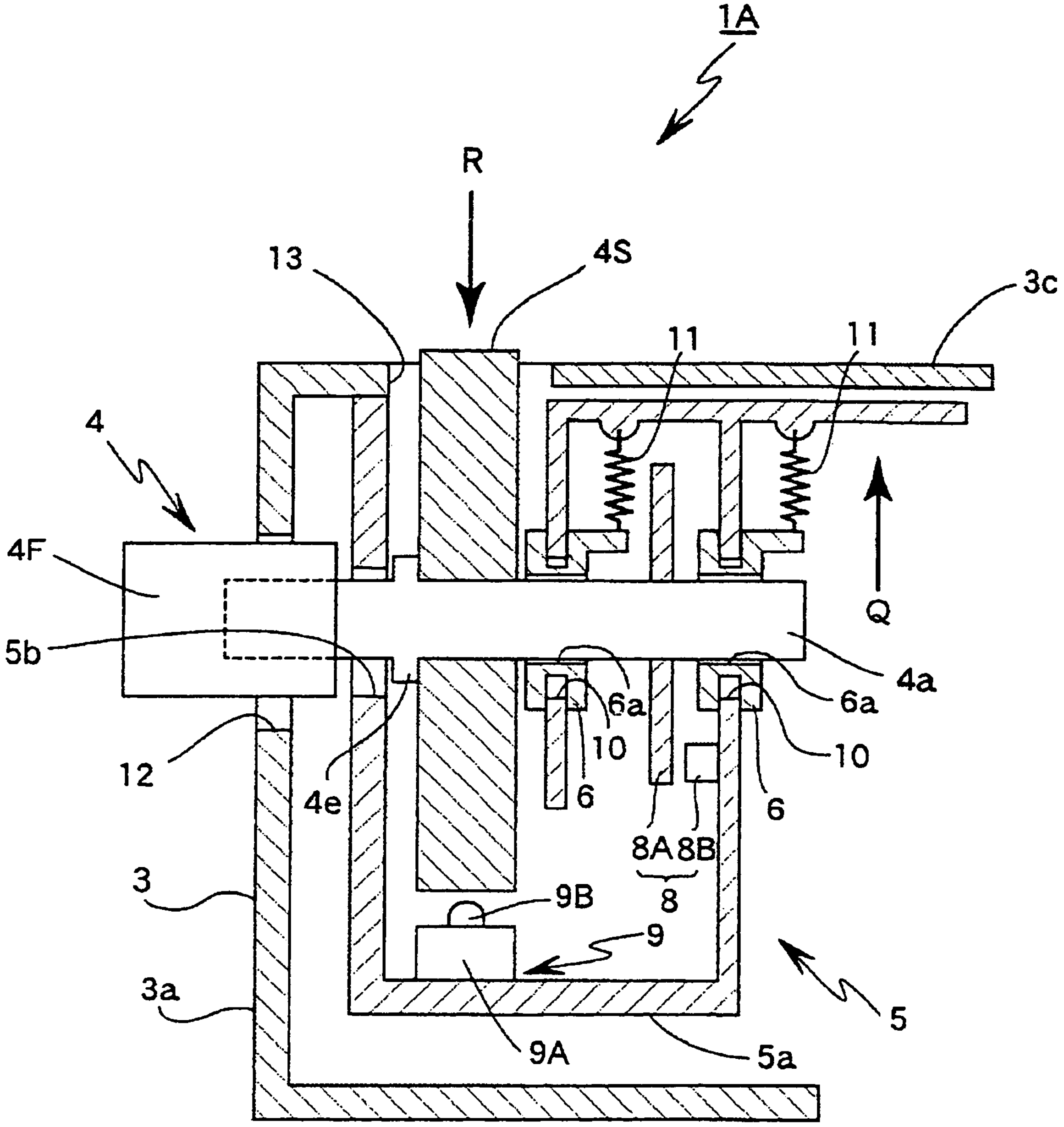
FIGS. 4 and 5 are drawings illustrating another embodiment according to the present invention, FIG. 4 being a drawing illustrating a main portion of an internal structure.
Figure 5:
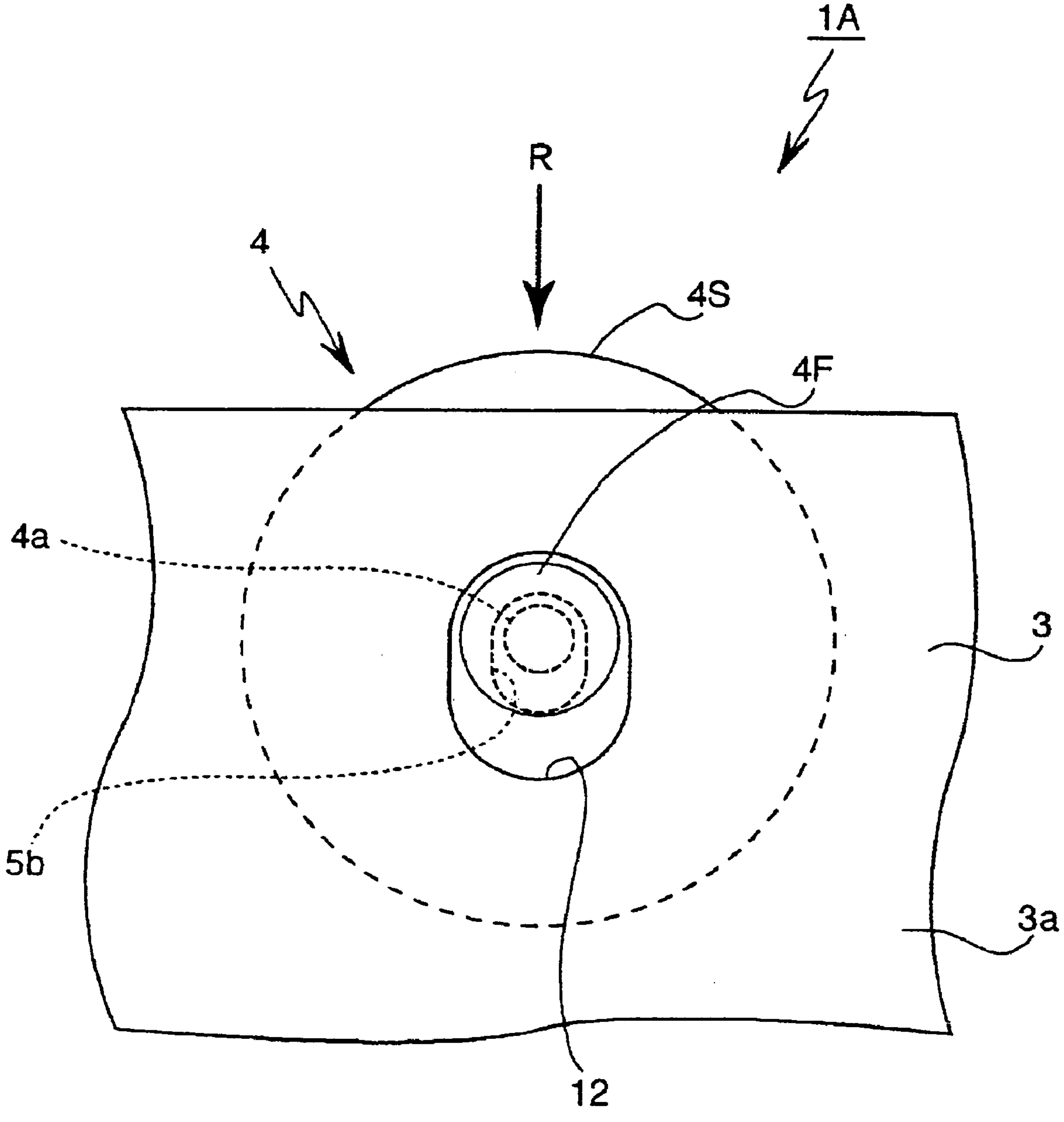

FIG. 4 shows a main portion of an embodiment of an operation device 1A.

Also in this embodiment, a small-diameter component 4F and a large-diameter component 4S of a rotary knob 4 are coaxially provided. The cylindrical small-diameter component 4F is fixed to an end of a rotating shaft 4*a*, whereas the disk large-diameter component 4S is fixed to the rotating shaft 4*a* in a support 5*a*. The rotating shaft 4*a* has a flange 4*e*, the large-diameter component 4S adjoining the flange 4*e* and being fixed to the rotating shaft 4*a*.

The rotating shaft 4*a* extends through central holes 6*a*,6*a* of shaft bearings 6,6 of the support 5*a* and can rotate. These shaft bearings 6,6 are engaged with large holes 10,10 for sliding that are formed on a wall and a frame of the support 5*a*, and urging means 11,11 (represented simply by spring symbols in the drawing) generate an urging force in the direction shown by arrow Q in FIG. 4.

An end of the small-diameter component 4F protrudes from a large opening 12 formed in an operation board 3*a* in an outer casing of a panel 3 or an electronic apparatus 2. An outer portion of the rotating shaft 4*a* from the flange 4*e* extends through a large opening 5*b* formed in the support 5*a*, and the small-diameter component 4F is fixed to the outer end of the rotating shaft 4*a*. Thus, the rotating shaft 4*a* can move in a direction perpendicular to the central axis of the rotation within the large opening 5*b*.

The periphery of the large-diameter component 4S is partially exposed from an insertion hole 13 formed in a side 3*c* of the outer casing of the panel 3 or electronic apparatus 2. For example, an operator can rotate the rotating shaft 4*a* quickly by rotating the small-diameter component 4F with a thumb, an index finger, and a middle finger or slowly by rotating the large-diameter component 4S exposed from the insertion hole 13 with the pad of the index finger, or can press the large-diameter component 4S to slide the rotating shaft 4*a* in the direction of arrow R shown in FIGS. 4 and 5.

Also in this embodiment, a rotation detecting means 8 includes a disk 8A fixed to the rotating shaft 4*a* (not having a rib 8C in this embodiment) and a sensor unit 8B facing the disk 8A, as in the previous embodiment.

The support 5*a* is provided with a detecting unit 9A facing the circumferential face of the large-diameter component 4S. The detecting unit 9A has a counterpart 9B that is pressed during the sliding operation of the large-diameter component 4S. When the detecting unit 9A is, for example, a detection switch, the large-diameter component 4S is pressed in the direction of arrow R, against the force applied to the shaft bearings 6,6 from the urging means 11,11. The shaft bearings 6,6 moves in the large holes 10,10 of the support 5*a* in the opposite direction of arrow Q and the large-diameter component 4S also moves in the opposite direction of arrow Q, so that the circumferential face of the large-diameter component 4S presses the counterpart 9B. This operation is detected by the detection switch.

As described above, the detecting unit 9A and the counterpart 9B constitute the determining means 9, which determines the rotated position of the rotary knob 4 when the rotary knob 4 is pressed in a direction perpendicular to the rotating shaft 4*a*.

In this embodiment, the counterpart 9B is pressed by the large-diameter component 4S. Alternatively, the counterpart 9B may be pressed by the rotating shaft 4*a* or a component moved with the rotating shaft 4*a*.

According to the above embodiments, the rotary knob having a plurality of components (can be three or more components) having different diameters allows an operator to select an appropriate operation component having a diameter that meets the operational purpose (a rapid rotational operation, a slow rotational operation, or a rotational operation for fine adjustment); thus, different responses to the operational angle are achieved. Furthermore, the operator can perform an intended operation with the large-diameter component and the small-diameter component of the rotary knob in response to the purpose of the operation.

In the determination of the position after the operation of the rotary knob, the above determining means can readily determine the rotated position by a simple operation, namely, pressing of the rotary knob along the rotating shaft or in a direction perpendicular to the rotating shaft.

Applications

Figure 6:
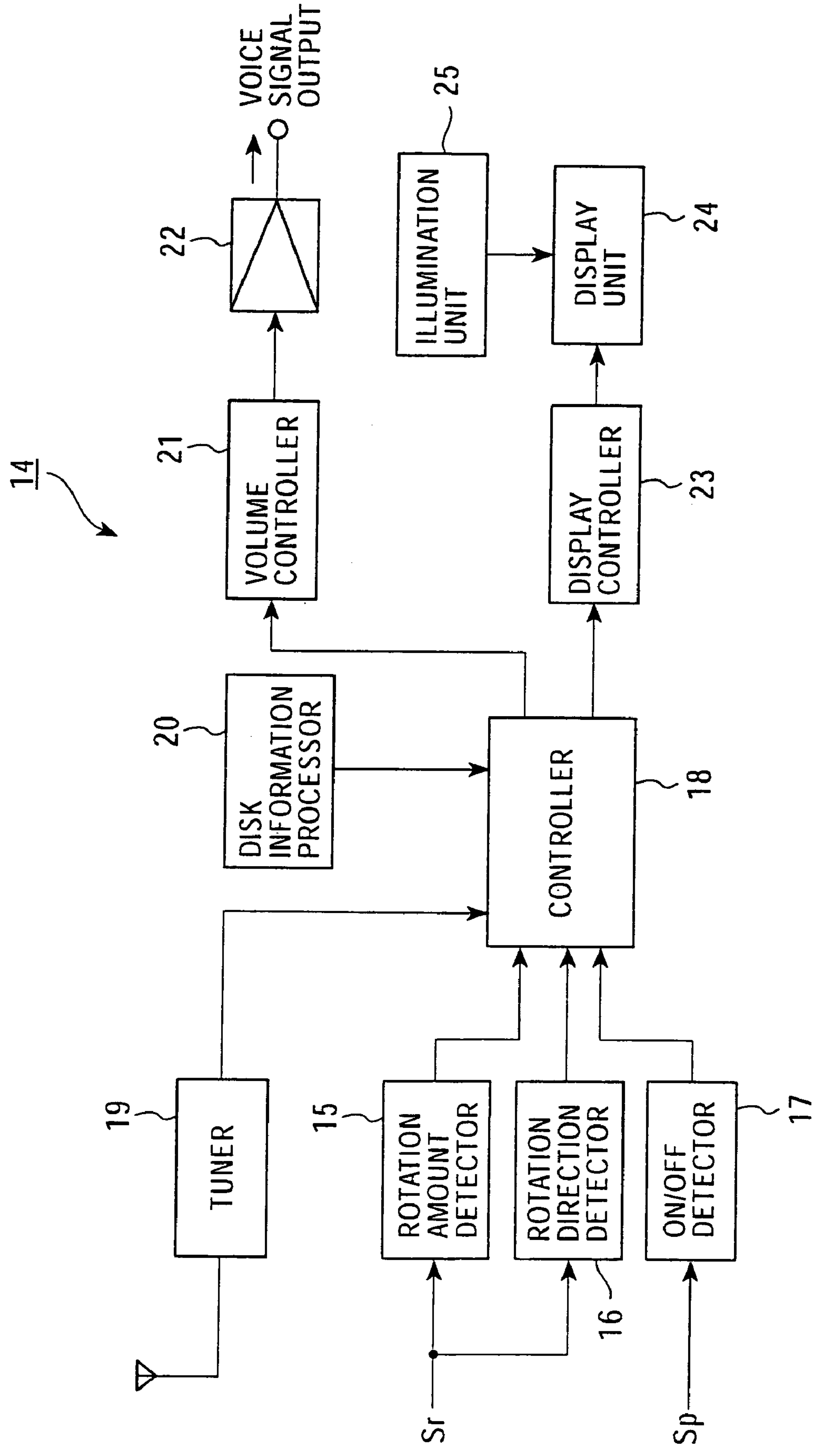
FIGS. 6 to 9 are drawings illustrating an embodiment according to the present invention, FIG. 6 being a block diagram of an embodiment of a configuration of an applied device.

FIG. 6 shows an application of the operating device according to the present invention in ambulance or vehicle equipment, more specifically is a block diagram illustrating an internal configuration 14 of an audio instrument including a tuner and a disk player. The above-described operating device 1 is mounted onto the front panel of the instrument in this embodiment.

Among signals acquired from the operating device 1, a rotation detection signal Sr detected by the sensor unit 8B during the rotational operation of the small-diameter component 4F or large-diameter component 4S of the rotary knob 4 is transmitted to a rotation amount (rotation angle) detector 15 and a rotation direction detector 16. A determination signal Sp generated in the detecting unit 9A during a pressing operation of the rotary knob 4 along the rotating shaft 4*a* is transmitted to an ON/OFF detector 17.

The rotation amount detector 15 determines the rotated angle of the rotary knob 4 based on the signal Sr and transmits the result to a controller 18.

The rotation direction detector 16 determines the rotational direction of the rotary knob 4 based on the signal Sr and transmits the result to the controller 18.

The ON/OFF detector 17 determines the signal state in response to the signal Sp (ON/OFF state depending on the determination) and transmits the result to the controller 18.

The controller 18 includes a CPU (central processing unit), a circuit for signal processing, i.e., voice signal processing, A/D conversion, and D/A conversion, and the circuit processes operational information transmitted from the rotation amount detector 15, the rotation direction detector 16, and the ON/OFF detector 17. The controller 18 processes voice signals from a tuner 19, and voice signals from a disk information processor 20 (including a read/write head for a disk recording medium, a signal processing circuit, and a mounting mechanism), and outputs the results through a volume controller 21 and an amplifier 22.

A display controller 23 processes information for a display unit 24 such as a liquid crystal display (LCD) and outputs drive signals to the display unit 24 in response to the signals from the controller 18. The display unit 24 is provided with an illumination unit 25.

Figure 7:
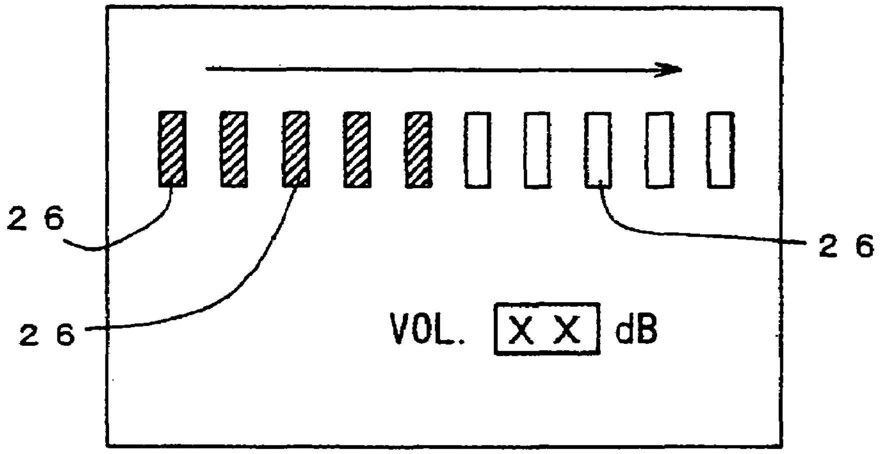
Figure 8:
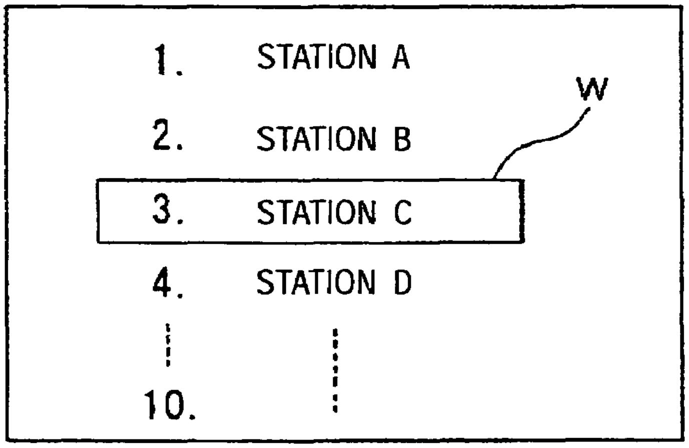
Figure 9:
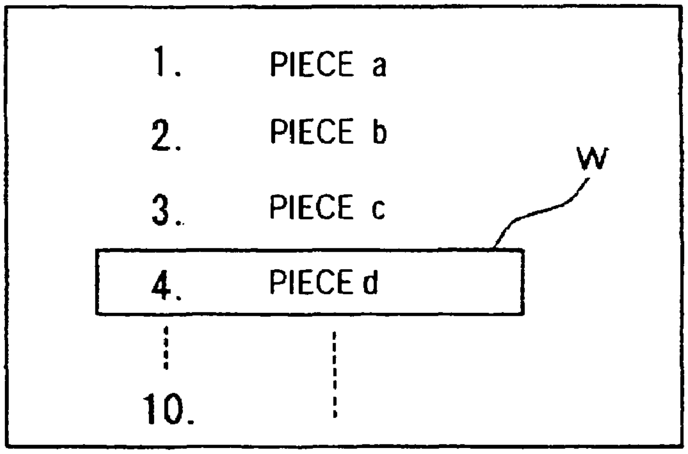

FIGS. 7 to 9 illustrates an operational embodiment and includes schematic images that are transmitted from the controller 18 to the display unit 24 via the display controller 23 and are displayed in the display unit 24.

FIG. 7 shows a screen page for adjusting the volume. Upon the rotation of the rotary knob 4, a level indicator (representing the quantity of the sound volume) consisting of a group of level-bar display elements 26,26, . . . transversely extending in the drawing shows changes in color and brightness. After selection of the desired volume ("XX" in the drawing indicates numerical display), the rotary knob 4 is pressed to determine the volume. For example, after the rotary knob 4 is pressed along the rotating shaft 4*a* to select the volume control mode, the rotary knob 4 is rotated in a given direction to increase the sound volume, or in the counter direction to decrease the sound volume, the level indicator on the display screen changing in response to the change in the sound volume.

FIG. 8 shows a screen page for selecting a station with a tuner 19, a plurality of vertically arranged list elements for selection (a broadcast station list including stations A, B, C, . . . or frequencies to be selected). After the rotary knob 4 is pressed for selecting the tuner 19 as a source, the rotary knob 4 is rotated to move a rectangular selection frame W in the vertical direction. After a desired list element is selected, the rotary knob 4 is pressed along the rotating shaft 4*a* to determine the selected station. When the rotary knob 4 is repressed to display the broadcasting station list, the station that was selected in the prior step is surrounded by the frame W by the memory effect. The same station can be selected merely by pressing the rotary knob 4, resulting in a simplified operation.

FIG. 9 shows a screen that displays a list of vertically arranged plural music pieces a, b, c, . . . , which are recorded on the disk recording medium, for selecting a desired piece. With the rotation of the rotary knob 4, a rectangular selection frame W vertically moves. After the desired piece is selected from the list, the rotary knob 4 is pressed along the rotating shaft 4*a* to select the piece to be played. In other words, the music sources recorded on the disk recording medium can be selected or changed by the pressing operation of the rotary knob 4, and the selection frame W can be moved upward or downward by the rotation of the rotary knob 4.

In the present invention, the type of the instruments is not limited. Thus, the present invention can be extensively applied to operations of visual instruments, various communication instruments such as mobile phones, game machines, information processing apparatuses, and so on, as well as audio instruments. For example, in the search of a required name from a phone number list in a mobile phone or the like, the name index from A to X is scanned rapidly with a small-diameter component for refine search, and then the required name is found by a slow operation with a large-diameter component. In this manner, these components can be selectively used according to the purpose. Also in an information processing apparatus, a required file can be retrieved from a numerous number of data in the same manner. Accordingly, operators can readily operate electronic apparatuses having operational knobs for required purposes and fine adjustments.

The slide operation for determining the position of the rotary knob after the operation of the rotary knob itself can be performed by an appropriate method, for example, a force applied during the pressuring operation or the number of the pressuring operations, in addition to the detection of the pressuring operation itself using the detecting switch.

As described above, in the rotary knob according to the present invention, the small-diameter component is used for rapid rotation whereas the large-diameter component is used for slow rotation and fine adjustment, resulting in superior operationality. The operator can visually differentiate these knob components and can perform the rapid operation and the slow or fine-adjustment operation with different diameter portions of the rotary knob. Since a plurality of rotary knobs are not used, the present invention has advantages of improved operationality, decreased space, and decreased cost.

According to the present invention, the rotated position can be determined by pressing the rotary knob along the rotating shaft with simplified operation.

According to the present invention, the rotated position can be determined by pressing the rotary knob in a direction perpendicular to the rotating shaft. Thus, the operator can readily differentiate the rotation direction and the pressing direction, resulting in a decreased unintended incorrect operation.

What is claimed is:

1. An operating device comprising:

a rotary knob; and rotation-detecting means for detecting a rotated angle of the rotary knob and providing a rotary position output, wherein the rotary knob includes a small-diameter component to facilitate a user quickly rotating the rotary knob and a large-diameter component to permit the user to slowly rotate the rotary knob so as to finely adjust a rotary position of the rotary knob, the rotation-detecting means includes determining means for determining a rotated position of the rotary knob when the rotary knob is rotated by the user, wherein the small-diameter component and the large-diameter component of the rotary knob are arranged coaxially on a shaft, and the rotation-detection means provides the rotary-position output when the rotary knob is pressed in a direction perpendicular to an axis of the shaft of the rotary knob, and wherein the shaft passes through central holes of shaft bearings mounted for sliding in holes formed in a support element, whereby movement in the direction perpendicular to the axis of the shaft of the rotary knob is enabled.

* * * * *